(12) United States Patent
Inagawa

(10) Patent No.: US 6,334,203 B1
(45) Date of Patent: Dec. 25, 2001

(54) ERROR DETECTING METHOD AND DEVICE AND SIGNAL DEMODULATING METHOD AND DEVICE

(75) Inventor: Osamu Inagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/201,878

(22) Filed: Nov. 30, 1998

(30) Foreign Application Priority Data

Nov. 28, 1997 (JP) ................................. 9-328548

(51) Int. Cl.[7] ........................................ G06F 11/00
(52) U.S. Cl. .................... 714/798; 370/203; 375/329; 375/308
(58) Field of Search .................. 714/798, 701, 714/786, 789; 370/514, 509, 203, 480; 381/1; 375/365, 368, 364, 340, 354, 325, 296, 308, 279, 222, 261, 329, 323

(56) References Cited

U.S. PATENT DOCUMENTS

| | | | |
|---|---|---|---|
| 5,974,091 | * 10/1999 | Huff | 375/265 |
| 6,091,789 | * 7/2000 | Weinholt | 375/371 |
| 6,125,103 | * 9/2000 | Bauml et al. | 370/203 |

FOREIGN PATENT DOCUMENTS

| | | | |
|---|---|---|---|
| 8-186606 | 7/1996 | (JP) | H04L/27/22 |
| 9-55772 | 2/1997 | (JP) | H04L/27/22 |
| 11-27336 | 1/1999 | (JP) | H04L/27/22 |

OTHER PUBLICATIONS

Po–Rong Chang et al. (Adaptive decision feedback equalization for digital satellite channels using multilayer neural networks, IEEE, Feb. 1995).*

Davidovici, S. et al. (Narrow–band interference rejection using real–time Fourier transforms; IEEE, Jul. 1989).*

Wupperman, B. et al. (A 16–PSK modulator with phase error correction; IEEE, Feb. 26, 1993).*

De Jonghe (Optimal averaging filter length for nondecision-aided feedforward carrier synchroniser; IEEE, Feb. 3, 1994).*

* cited by examiner

*Primary Examiner*—Albert Decady
*Assistant Examiner*—Guy Lamarre
(74) *Attorney, Agent, or Firm*—McGinn & Gibb, PLLC (57) ABSTRACT

In an error detecting method and device for calculating a phase error in a PSK modulated signal having a predetermined modulation phase number, and so configured that a received phase of the modulated signal is mapped on a complex plane by allocating an inphase signal and a quadrature signal generated from the modulated signal as values of the axis of abscissas and the axis of ordinates, and a phase error between the received phase of the modulated signal thus mapped and a reference phase in each of a plurality of signal areas. The phase error between the received phase of the modulated signal mapped on the complex plane and a reference phase in each of the plurality of signal areas, is calculated as a distance between the mapped position of the modulated signal and a reference straight line, from at least one of the inphase signal and the quadrature signal, so as to obtain a plurality of phase errors. One signal area to which the received phase is mapped, is discriminated and selected from the plurality of signal areas, on the basis of the inphase signal and the quadrature signal. One phase error corresponding to the discriminated signal area is selected from the plurality of phase errors calculated above.

19 Claims, 5 Drawing Sheets

OCTAL PHASE (8 PHASES)    QUADRATURE PHASE (4 PHASES)    BINARY PHASE (2 PHASES)

PHASE ERROR

ERROR DETECTOR OUTPUT VALUE $\dfrac{ax_1 + by_1 + c}{\sqrt{a^2 + b^2}}$

*Fig. 8A*

8-PHASE PHASE-ERROR

*Fig. 8B*

QUADRATURE-PHASE PHASE-ERROR

*Fig. 8C*

BINARY-PHASE PHASE-ERROR

Fig. 9
(PRIOR ART)

8PSK
(CPDC=1)

QPSK (1)
(CPDC=2)

Fig. 11B

QPSK (2)
(CPDC=3)

Fig. 12A

BPSK (1)
(CPDC=4)

Fig. 12B

BPSK (2)
(CPDC=5)

Fig. 12C

BPSK (3)
(CPDC=6)

Fig. 12D

BPSK (4)
(CPDC=7)

ERROR DETECTING METHOD AND DEVICE AND SIGNAL DEMODULATING METHOD AND DEVICE

BACKGROUND OF THE INVENTION

1. Field of the invention

The present invention relates to an error detecting method and device for detecting a phase error in a PSK modulated signal, and a signal demodulating method and device for demodulating a PSK modulated signal.

2. Description of related art

In the prior art, a PSK (phase shift keying) system is known as one modulating means in the case of transmitting a digital signal. In this PSK system, a binary value of a digital signal is expressed by a phase of a modulated signal. For example, if the modulation phase number is $2^M$, a digital signal of M bits can be transmitted at once.

In a signal demodulation device receiving and demodulating this PSK modulated signal, an inphase signal and a quadrature signal are generated from a received modulated signal, a phase difference between a received phase of the modulated signal and a reference phase is detected on the basis of the inphase signal and the quadrature signal, and then, the detected phase difference is fed back to synchronously demodulate the inphase signal and the quadrature signal.

Figure 9:
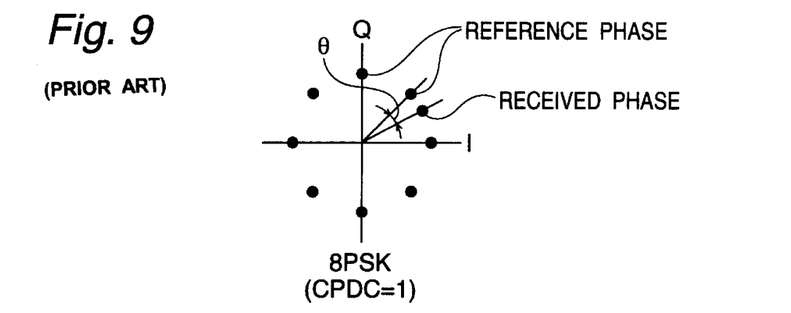
FIG. 9 illustrates that the received phase is mapped in the complex plane having the reference phase set therein.

To detect the phase difference of the modulated signal on the basis of the inphase signal and the quadrature signal, is that, as shown in FIG. 9, the received phase of the modulated signal is mapped by allocating the inphase signal and the quadrature signal as values of the axis of abscissas and the axis of ordinates in a complex plane, and an interior angle θ between a pair of lines one passing from the origin to the received phase and other passing from the origin to the reference phase, is calculated. Incidentally, in FIG. 9, reference phases of a 8-phase modulated signal are plotted in the complex plane.

A specific procedure for detecting the phase difference of the modulated signal on the basis of the inphase signal and the quadrature signal as mentioned above, includes for example use of a previously prepared table. Namely, phase errors previously calculated from $\{\tan^{-1}\theta\}$ is set in a table addressed with the inphase signal and the quadrature signal, and the table thus completed is stored in an information storing medium such as a ROM (read only memory).

However, this requires a large storage capacity for the information storing medium, and therefore, the error detecting device becomes too large. In order to solve this problem, it may be considered to calculate, in real time, the phase difference or phase error from the inphase signal and the quadrature signal without using the above mentioned table.

The device for executing this calculation is disclosed in for example "Fundamentals and Applications of Digital PLL", (Japanese language book) page 93, Trikeppuse EX11. This book shows a simple circuit for approximately calculating the phase error from the inphase signal and the quadrature signal, and therefore, if this circuit is used, it is possible to remarkably reduce the circuit scale of the error detecting device.

In addition, at present, it is considered to utilize the PSK modulated signal a digital broadcasting in order to transmit a high quality image data. In this consideration, it is also considered to sequentially transmit in a time sharing manner, a plurality of kinds of PSK modulated signals having different modulation phase numbers, as shown in FIG. 10.

Figure 10:
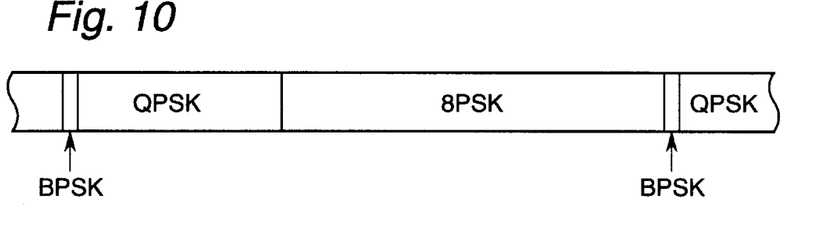
FIG. 10 illustrates the modulation phase number of the modulated signal changing in a time division manner.

For example, when modulated signals of two phases to 8 phases (binary phase shift keying (BPSK), quadrature phase shift keying (QPSK), and octal phase shift keying (OPSK or 8PSK)) are transmitted in a time division as shown in FIG. 10, if the image data is transmitted by the modulated signals of QPSK and 8PSK, a signal demodulating device can reproduce a high quality image data from the modulated signals of 8PSK if a communication condition is good, and also can reproduce a low quality image data from the modulated signals of QPSK if the communication condition is bad. Furthermore, it is also considered to make the timing division ratio of the QPSK modulated signal and the 8PSK modulated signal variable, and to transmit the timing division ratio by the BPSK modulated signal.

If the above mentioned digital broadcasting is realized, since the As signal demodulating device is necessarily required to demodulate the plurality of Ends of PSK modulated signals having different modulation phase numbers, the error detecting device is also required to detect the phase error in the plurality of kinds of PSK modulated signals. For example, since the circuit disclosed by the above referred book for detecting the phase error is different between the binary phase and the quadrature phase, if the phase error device capable of complying with both the binary phase and the quadrature phase is constructed by using the circuit disclosed by the above referred book, it is sufficient if a circuit for the binary phase and anther circuit the quadrature phase are constructed separately from each other, and are connected in parallel to a selector circuit.

As mentioned above, if the phase error detecting circuits are provided for different phase numbers, respectively and are connected in parallel to the selector circuit, it is possible to detect the phase error of the plurality of kinds of modulated signals having different modulation phase numbers. However, in the circuit disclosed by the above referred book, since a phase error calculating method is different from the binary phase to the quadrature phase, a phase error detecting sensitivity becomes different from the binary phase to the quadrature phase.

In detail, in the circuit disclosed by the above referred book, since the reference phase of the binary phase is positioned on the axis of ordinates in the complex plane, the phase error is approximately calculated by multiplying a quadrature signal Q by a positive/negative sign of an inphase signal I. In the quadrature phase, since the reference phase is positioned at an angle of 45° to the axis of ordinates and the axis of abscissas in the complex plane, the phase error is approximately calculated by subtracting the value obtained by multiplying the quadrature signal Q by a positive/negative sign of the inphase signal I, from the value obtained by multiplying the inphase signal I by a positive/negative sign of the quadrature signal Q.

For example, it is possible to position the reference positions of the quadrature phase on the axis of the complex plane and to make the detection sensitivity of the phase error to comply with the binary phase. However, if the modulation phase number of the modulated signal is changed in the time division, a plurality of reference position patterns appear in the modulated signal having a small modulation phase number.

Figure 12A:
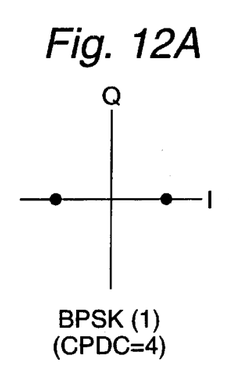
FIGS. 12A, 12B, 12C and 12D diagrammatically illustrate the four different area patterns of the binary phase.
Figures 12B, 12C:
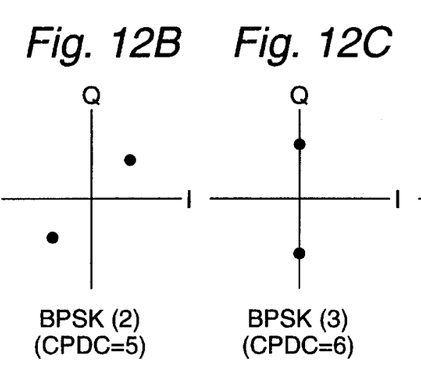

For example, when the modulation phase number changes from the quadrature phase to the binary phase as mentioned above, even if the reference positions of the quadrature phase are positioned in the complex plane as shown in FIG. 12A, the reference positions of tie binary phase can assume two different conditions, in one of which the reference positions are positioned on the axis of abscissas in the complex plane as shown in FIG. 12A, and in the other of which the reference positions are positioned on the axis of ordinates in the complex plane as shown in FIG. 12C. In these two conditions, the phase error detecting method is different from each other, and therefore, the one phase difference detecting circuit as mentioned above for the binary phase can no longer comply with.

Figure 11A:
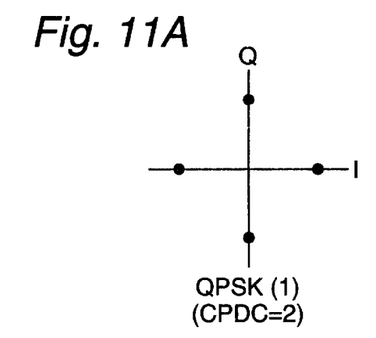
FIGS. 11A and 11B diagrammatically illustrate the two different area patterns of the quadrature phase.
Figure 11B:
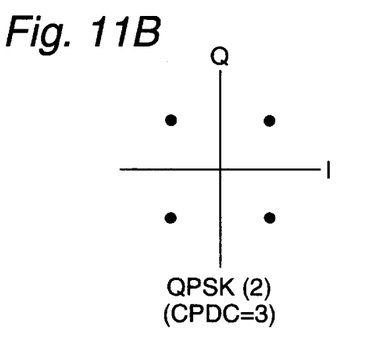

When the modulation phase number is caused to change from the binary phase to the octal phase as mentioned above, the reference position patterns of the quadrature phase in the complex phase becomes two as shown in FIGS. 11A and 11B, and the reference position patterns of the binary phase in the complex phase becomes four as shown in FIGS. 12A, 12B, 12C and 12D. Therefore, it becomes difficult to detect the phase error with an appropriate sensitivity.

SUMMARY OF THE INVENTION

Accordingly, it is an object of the present invention to provide an error detecting method and device for detecting a phase error in a PSK modulated signal, which have overcome the above mentioned problem of the prior art.

Another object of the present invention is to provide an error detecting method and device, capable of appropriately detecting the phase error when the modulation phase number changes, without requiring a large scale circuit.

Still another object of the present invention is to provide a signal demodulating method and device capable of demodulating a modulated signal having a changing modulation phase number, without requiring a large scale circuit.

The above and other objects of the present invention are achieved in accordance with the present invention by an error detecting method for calculating a phase error in a PSK modulated signal having a predetermined modulation phase number, and so configured that a received phase of the modulated signal is mapped on a complex plane by allocating an inphase signal and a quadrature signal generated from the modulated signal as values of the axis of abscissas and the axis of ordinates, and a phase error between the received phase of the modulated signal thus mapped and a reference phase in each of a plurality of signal areas, the method including the steps of:

calculating the phase error between the received phase of the modulated signal mapped on the complex plane and a reference phase in each of the plurality of signal areas, as a distance between the mapped position of the modulated signal and a reference straight line, from at least one of the inphase signal and the quadrature signal, so as to obtain a plurality of phase errors;

discriminating one signal area to which the received phase is mapped, from the plurality of signal areas, on the basis of the inphase signal and the quadrature signal; and selecting one from the plurality of phase errors calculated above, in accordance with the discriminated signal area.

For example, if the modulation phase number of the modulated signal is eight phases, the received phase is mapped to the complex plane divided into eight signal areas, and the distance between one mapped position and eight reference straight lines are calculated as eight phase errors. On the other hand, one signal area to which the received phase is mapped is discriminated and selected from the eight signal areas, and one phase error corresponding to the discriminated signal area is selected from the eight phase errors. Since this phase error is approximately calculated as the distance between the mapped position and the reference straight line, the calculation of the phase error can be simply and easily processed.

Here, the reference phase means a phase becoming the reference for calculating the phase error from the modulated signal. For example, if the modulation phase number is eight phase, eight reference phases are set which are obtained by rotating by each 45° from a position of 0°. The reference straight line means a straight line passing from the origin through the reference phase on the complex plane. For example, if the modulation phase number is eight phase, there are eight reference straight lines at each 45° from a position of 0°. The signal areas means areas obtained by equally dividing the complex plane by the modulation phase number in such a manner that each reference straight line is positioned at an angular center line of a corresponding signal area For example, if the modulation phase number is eight phase, there are eight signal areas each having an interior angle of 45°, in such a manner that a first signal area is extended in the range of −22.5° to +22.5°, a second signal area is extended in the range of +22.5° to +67.5°, and so on.

According to a second aspect of the present invention, there is provided an error detecting method for calculating a phase error in a PSK modulated signal having a modulation phase number changing in a time division manner, and so configured that a received phase of the modulated signal is mapped on a complex plane by allocating an inphase signal and a quadrature signal generated from the modulated signal as values of the axis of abscissas and the axis of ordinates, and a phase error between the received phase of the modulated signal thus mapped and a reference phase in each of a plurality of signal areas, the method including the steps of:

calculating the phase error between the received phase of the modulated signal mapped on the complex plane and a reference phase in each of the plurality of signal areas corresponding to a maximum modulation phase number, from at least one of the inphase signal and the quadrature signal, so as to obtain a plurality of phase errors;

discriminating one signal area to which the received phase is mapped, from the plurality of signal areas corresponding to the modulation phase number of the modulated signal, on the basis of the inphase signal and the quadrature signal; and selecting one from the plurality of phase errors calculated above, in accordance with the discriminated signal area.

For example, if the modulation phase number of the modulated signal having the modulation phase number changing from two phases to eight phases is four phases, the received phase is mapped to the complex plane divided into four signal areas corresponding to the modulation phase number, and eight phase errors are individually calculated between the one mapped position and the eight reference straight lines corresponding to the maximum modulation phase number. In addition, one signal area to which the received phase is mapped, is selected from the four signal areas, and one phase error corresponding to the selected signal area is selected from the eight phase errors, so that one appropriate phase error of the modulated signal can be outputted. The phase error thus outputted corresponds to the reference phase of the maximum modulation phase number, and is the same even if the modulation phase number of the modulated signal changes. Therefore, the detection sensitivity of the phase error does not vary even if the modulation phase number of the modulated signal changes in the time division manner.

According to a third aspect of the present invention, there is provided an error detecting device for calculating a phase error in a PSK modulated signal having a predetermined modulation phase number, and so configured that a received phase of the modulated signal is mapped on a complex plane by allocating an inphase signal and a quadrature signal generated from the modulated signal as values of the axis of abscissas and the axis of ordinates, and a phase error between the received phase of the modulated signal thus mapped and a reference phase in each of a plurality of signal areas, the device including:

- a signal mapping means for mapping the received phase of the modulated signal on the complex plane divided into a plurality of signal areas corresponding to the modulation phase number, by allocating the inphase signal and the quadrature signal as the values of the axis of abscissas and the axis of ordinates,
- an error calculating means for calculating the phase error between the received phase of the modulated signal mapped by the signal mapping means and a reference phase in each of the plurality of signal areas, as a distance between the mapped position of the modulated signal and a reference straight line, from at least one of the inphase signal and the quadrature signal, so as to obtain a plurality of phase errors;
- an area discriminating means for discriminating one signal area to which the received phase is mapped, from the plurality of signal areas, on the basis of the inphase signal and the quadrature signal; and
- an error selecting means for selecting one from the plurality of phase errors calculated by the error calculating means, in accordance with the signal area discriminated by the area discriminating means.

For example, if the modulation phase number of the modulated signal is eight phases, the received phase is mapped to the complex plane divided into eight signal areas, and the distance between one mapped position and eight reference straight lines are calculated as eight phase errors. On the other hand, one signal area to which the received phase is mapped is discriminated and selected from the eight signal areas, and one phase error corresponding to the discriminated signal area is selected from the eight phase errors. Since this phase error is approximately calculated as the distance between the mapped position and the reference straight line, the calculation of the phase error can be simply and easily processed. Therefore, the error detecting device can be realized in a small scale circuit having a simple construction.

In addition, various means included in the error detecting device can be constituted of any means if a necessary function is realized. For example, the various means can be constituted of a dedicated hardware, or alternatively, can be realized by a computer installed with a program for the necessary function, or a function internally realized in a computer by an appropriate program, or may be a combination of these means.

According to a fourth aspect of the present invention, there is provided an error detecting device for calculating a phase error in a PSK modulated signal having a modulation phase number changing in a time division manner, and so configured that a received phase of the modulated signal is mapped on a complex plane by allocating an inphase signal and a quadrature signal generated from the modulated signal as values of the axis of abscissas and the axis of ordinates, and a phase error between the received phase of the modulated signal thus mapped and a reference phase in each of a pl of signal areas, the device including:

- a signal mapping means for mapping the received phase of the modulated signal on the complex plane divided into a plurality of signal areas corresponding to the modulation phase number, by allocating the inphase signal and the quadrature signal as the values of the axis of abscissas and the axis of ordinates,
- an error calculating means for calculating the phase error between the received phase of the modulated signal mapped by the signal mapping means and a reference phase in each of the plurality of signal areas corresponding to a maximum modulation phase number, from at least one of the inphase signal and the quadrature signal, so as to obtain a plurality of phase errors;
- an area discriminating means for discriminating one signal area to which the received phase is mapped, from the plurality of signal areas corresponding to the modulation phase number of the modulated signal, on the basis of the inphase signal and the quadrature signal; and
- an error selecting means for selecting one from the plurality of phase errors calculated by the error calculating means, in accordance with the signal area discriminated by the area discriminating means.

For example, if the modulation phase number of the modulated signal having the modulation phase number changing from two phases to eight phases is four phases, the received phase is mapped to the complex plane divided into four signal areas corresponding to the modulation phase number, and eight phase errors are individually calculated between the one mapped position and the eight reference straight lines corresponding to the maximum modulation phase number. In addition, one signal area to which the received phase is mapped, is selected from the four signal areas, and one phase error corresponding to the selected signal area is selected from the eight phase errors, so that one appropriate phase error of the modulated signal can be outputted The phase error thus outputted corresponds to the reference phase of the maximum modulation phase number, and is the same even if the modulation phase number of the modulated signal changes. Therefore, the detection sensitivity of the phase error does not vary even if the modulation phase number of the modulate signal changes in the time division manner.

Preferably, the error calculating means calculates the phase error between the received phase of the modulated signal mapped by the signal mapping means and a reference phase in each of the plurality of signal areas corresponding to the maximum modulation phase number, as a distance between the mapped position of the modulated signal and a reference straight line, from at least one of the inphase signal and the quadrature signal, so as to obtain a plurality of phase errors.

In this case, since the phase error is approximately calculated as the distance between the mapped position and the reference straight line, the calculation of the phase error can easily and simply be processed. Therefore, the error detecting device can be constituted of a small scale circuit having a simple construction.

For example, when the modulation phase number of the modulated signal is eight phases, the error calculating means calculates the phase error between eight reference phases and the modulated signal, as "Q√2", "−I+Q", "−I√2", "−I−Q", "−Q√2", "I−Q", "I√2" and "I+Q", the inphase signal I and the quadrature signal Q. In this example, the phase error of the octal phase PSK modulated signal can be calculated as the distance between the mapped position and the reference straight lines, and therefore, the circuit for calculating the phase error can be reduced in circuit scale.

Alternatively, when the modulation phase number of the modulated signal changing in the time division manner includes three kinds of two phases, four phases, and eight phases, the error calculating means calculates the phase error between eight reference phases and the modulated signal, as "Q√2", "−I+Q", "−I√2", "−I−Q", "−Q√2", "I−Q", "I√2" and "I+Q", the inphase signal I and the quadrature signal Q. In this example, the phase error of the modulated signal having the modulation phase number changing in the time division manner can be calculated as the distance between the mapped position and the reference straight lines, and therefore, the detection sensitivity of the phase error does not vary even if the modulation phase number of the modulated signal changes.

In another embodiment, the error calculating means calculates only one of a pair of phase errors having the same value and different positive/negative signs, and then, sign-inverts the calculated phase error.

Therefore, when the error calculating means calculates "Q√2", "−I+Q", "−I√2", "−I−Q", "−Q√2", "I−Q", "I√2" and "I+Q", as the phase errors, for example, only one of "Q√2" and "−Q√2" is calculated, and the calculated phase error is sign-inverted. Similarly, only one of "−I+Q" and "I−Q", only one of "−I√2" and "I√2" and only one of "−I−Q" and "I+Q" are calculated, and the respective calculated phase errors are sign-inverted. In dais case, the circuit for calculating a number of phase errors can be simplified.

For example, the above mentioned error calculating means includes four error calculating circuits each calculating only one of a pair of phase errors having the same value and different positive/negative signs, and a positive/negative signs inverting circuit receiving the output of each of the four error calculating circuits for outputting a sign-inverted phase error. Thus, the eight phase errors can be speedily calculated by a simple circuit.

Furthermore, when the modulation phase number of the modulated signal is the two phases, the area discriminating means detects one of the "positive/negative sign of the inphase signal I", the "positive/negative sign of the quadrature signal Q", the "positive/negative sign of the sum of the inphase signal I and the quadrature signal Q", and the "positive/negative sign of the result obtained by subtracting one of the inphase signal I and the quadrature signal Q from the other", for the four area patterns, and selects one from the two signal areas.

Accordingly, when the modulation phase number change from the eight phases to the two phases, the area patterns for the two phases becomes four. From the two signal areas of each of the four area patterns, one signal area to which the received phase is mapped, is selected on the basis of the inphase signal I and the quadrature signal Q. For example, in the area pattern in which the complex plane is divided into a signal area of "0° to 180°" and another signal area of "180° to 0°", one signal area is selected from the two signal areas on the basis of the "positive/negative sign of the quadrature signal Q". In the area pattern in which the complex plane is divided into a signal area of "45° to 225°" and another signal area of "225° to 45°", one signal area is selected from the two signal areas on the basis of the "positive/negative sign of the result obtained by subtracting one of the inphase signal I and the quadrature signal Q from the other". In the area pattern in which the complex plane is divided into a signal area of "90° to 270°" and another signal area of "270° to 90°", one signal area is selected from the two signal areas on the basis of the "positive/negative sign of the inphase signal I". In the area pattern in which the complex plane is divided into a signal area of "135° to 315°" and another signal area of "315° to 135°", one signal area is selected from the two signal areas on the basis of the "positive/negative sign of the sum of the inphase signal I and the quadrature signal Q".

Thus, the necessary phase error signal can be simply and surely obtained from the inphase signal I and the quadrature signal Q.

In addition, when the modulation phase number of the modulated signal is the four phases, the area discriminating means detects one of the "positive and negative combination of the inphase signal I and the quadrature signal Q", and the "positive/negative sign of the result obtained by subtracting one of the inphase signal I and the quadrature signal Q from the other", for the two area patterns, and selects one from the four signal areas.

Accordingly, when the modulation phase number change from the eight phases to the two phases, the area patterns for the four phases becomes two. From the four signal areas of each of the two area patterns, one signal area to which the received phase is mapped, is selected on the basis of the inphase signal I and the quadrature signal Q. For example, in the area pattern in which the complex plane is divided into four signal areas of "0° to 90°", "90° to 180°", "180° to 270°" and "270° to 0°", and another signal area of "180° to 0", one signal area is selected from the four signal areas on the basis of the "positive and negative combination of the inphase signal I and the quadrature signal Q". In the area pattern in which the complex plane is divided into four signal areas of "45° to 135°", "135° to 225°", "225° to 315°", and "315° to 45°", one signal area is selected from the four signal areas on the basis of the "sign of the result obtained by subtracting one of the inphase signal I and the quadrature signal Q from the other".

Thus, the necessary phase error signal can be simply and surely obtained from the inphase signal I and the quadrature signal Q.

Alternatively, in the case that the modulation phase number of the modulated signal changing in the time division manner includes three kinds of two phases, four phases, and eight phases, when the modulation phase number of the modulated signal is the two phases, the area discriminating means detects one of the "positive/negative sign of the inphase signal I", the "positive/negative sign of the quadrature signal Q", the "positive/negative sign of the sum of the inphase signal I and the quadrature signal Q", and the "positive/negative sign of the result obtained by subtracting one of the inphase signal I and the quadrature signal Q from the other", for the four area patterns, and selects one from the two signal areas. When the modulation phase number of the modulated signal is the four phases, the area discriminating means detects one of the "positive and negative combination of the inphase signal I and the quadrature signal Q", and the "positive/negative sign of the result obtained by subtracting one of the inphase signal I and the quadrature signal Q from the other", for the two area patterns, and selects one from the four signal areas. When the modulation phase number of the modulated signal is the eight phases, the area discriminating means selects one signal area from each two area patterns for the four phases, causes the error calculating means to calculate the phase error in each of the two area patterns, and selects a smaller one from the two calculated phase errors.

In this case, when the modulation phase number change from the eight phases to the two phases, the area patterns for the two phases becomes four. From the two signal areas of each of the four area patterns, one signal area to which the received phase is mapped, is selected on the basis of the inphase signal I and the quadrature signal Q. The area patterns for the four phases becomes two. From the four signal areas of each of the two area patterns, one signal area to which the received phase is mapped, is selected on the basis of the inphase signal I and the quadrature signal Q. The area pattern for the eight phases is one. When one signal area to which the received phase is mapped, is selected from the eight signal areas, one signal area is selected in each of the two area patterns for the four phases, and a phase error is calculated in each selected signal area, and then, a smaller one is selected from the two phase errors.

Thus, the necessary phase error signal can be simply and surely obtained from the inphase signal I and the quadrature signal Q.

According to a further aspect of the present invention, there is provided a signal demodulating method comprising the steps of:

receiving a PSK modulated signal having a predetermined modulation phase number, generating an inphase signal and a quadrature signal from the modulated signal;

mapping a received phase of the modulated signal on a complex plane divided into a plurality of signal areas corresponding to the modulation phase number, by allocating the inphase signal and the quadrature signal as values of the axis of abscissas and the axis of ordinates;

calculating the phase error between the received phase of the modulated signal mapped on the complex plane and a reference phase in each of the plurality of signal areas, as a distance between the mapped position of the modulated signal and a reference straight line, from at least one of the inphase signal and the quadrature signal, so as to obtain a plurality of phase errors;

discriminating one signal area to which the received phase is mapped, from the plurality of signal areas, on the basis of the inphase signal and the quadrature signal;

selecting one from the plurality of phase errors calculated above, in accordance with the discriminated signal area; and synchronously demodulating the inphase signal and the quadrature signal by feeding back the selected phase error.

In this case, the phase error of the modulated signal can be calculated as the distance between the mapped position and the reference straight line, and therefore, calculation of the phase error can be easily and simply processed According to a still further aspect of the present invention, there is provided a signal demodulating method comprising the steps of:

receiving a PSK modulated signal having different modulation phase numbers sequentially transmitted in a time division manner;

generating an inphase signal and a quadrature signal from the modulated signal and detecting the modulation phase numbers sequentially changing in the time division manner;

mapping a received phase of the modulated signal on a complex plane divided into a plurality of signal areas corresponding to the modulation phase number, by allocating the inphase signal and the quadrature signal as values of the axis of abscissas and the axis of ordinates;

calculating the phase error between the received phase of the modulated signal mapped on the complex plane and a reference phase in each of the plurality of signal areas corresponding to a maximum modulation phase number, from at least one of the inphase signal and the quadrature signal, so as to obtain a plurality of phase errors;

discriminating one signal area to which the received phase is mapped, from the plurality of signal areas corresponding to the modulation phase number, on the basis of the inphase signal and the quadrature signal;

selecting one from the plurality of phase errors calculated above, in accordance with the discriminated signal area; and synchronously demodulating the inphase signal and the quadrature signal by feeding back the selected phase error.

Since the phase error of the modulated signal corresponds to the reference phase of the maximum modulation phase number, the phase error is the same even if the modulation phase number of the modulated signal changes. Therefore, even if the modulation phase number of the modulated signal changes in the time division manner, the detection sensitivity of the phase error does not vary. Accordingly, the modulated signal having the changing modulation phase number can be appropriately demodulated.

According to a further aspect of the present invention, there is provided a signal demodulating device comprising:

a data receiving means for receiving a PSK modulated signal having a predetermined modulation phase number;

a signal generating means for generating an inphase signal and a quadrature signal from the modulated signal received by the data receiving means;

a signal mapping means for mapping a received phase of the modulated signal on a complex plane divided into a plurality of signal areas corresponding to the modulation phase number, by allocating the inphase signal and the quadrature signal as values of the axis of abscissas and the axis of ordinates;

an error calculating means for calculating the phase error between the received phase of the modulated signal mapped by the signal mapping means and a reference phase in each of the plurality of signal areas, as a distance between the mapped position of the modulated signal and a reference straight line, from at least one of the inphase signal and the quadrature signal, so as to obtain a plurality of phase errors;

an area discriminating means for discriminating one signal area to which the received phase is mapped, from the plurality of signal areas, on the basis of the inphase signal and the quadrature signal;

an error selecting means for selecting one from the plurality of phase errors calculated by the error calculating means, in accordance with the signal area discriminated by the area discriminating means; and signal synchronizing means for synchronously demodulating the inphase signal and the quadrature signal by feeding back the selected phase error selected by the error selecting means.

In this case, the phase error of the modulated signal can be calculated as the distance between the mapped position and the reference straight line, and therefore, calculation of the phase error can be easily and simply processed. Accordingly, the signal demodulating device can be constituted of a small scale circuit having a simple construction.

In one embodiment, the receiving means receives a PSK modulated signal having different modulation phase numbers sequentially transmitted in a time division manner, and the device further includes a phase number detecting means for detecting the modulation phase numbers sequentially changing in the time division maimer, of the modulated signal received by the data receiving means. In addition, the error calculating means calculates the phase error between the received phase of the modulated signal mapped on the complex plane and a reference phase in each of the plurality of signal areas corresponding to a maximum modulation phase number, from at least one of the inphase signal and the quadrature signal, so as to obtain a plurality of phase errors, and the area discriminating means discriminates the one signal area to which the received phase is mapped, from the plurality of signal areas corresponding to the modulation phase number, on the basis of the inphase signal and the quadrature signal.

In this embodiment, since the phase error of the modulated signal corresponds to the reference phase of the maximum modulation phase number, the phase error is the same even if the modulation phase number of the modulated signal changes. Therefore, even if the modulation phase number of the modulated signal changes in the time division manner, the detection sensitivity of the phase error does not vary. Accordingly, the modulated signal having the changing modulation phase number can be appropriately demodulated. Furthermore, the signal demodulating device can be constituted of a small scale circuit having a simple construction.

According to a further aspect of the present invention, there is provided a signal demodulating device comprising.
- a data receiving means for receiving a PSK modulated signal having different modulation phase numbers sequentially transmitted in a time division manner;
- a signal generating means for generating an inphase signal and a quadrature signal from the modulated signal received by the data receiving means;
- a phase number detecting means for detecting the modulation phase numbers sequentially changing in the time division manner, of the modulated signal received by the data receiving means;
- a signal mapping means for mapping a received phase of the modulated signal on a complex plane divided into a plurality of signal areas corresponding to the modulation phase number, by allocating the inphase signal and the quadrature signal as values of the axis of abscissas and the axis of ordinates;
- an error calculating means for calculating the phase error between the received phase of the modulated signal mapped by the signal mapping means and a reference phase in each of the plurality of signal areas corresponding to a maximum modulation phase number, from at least one of the inphase signal and the quadrature signal, so as to obtain a plurality of phase errors;
- an area discriminating means for discriminating one signal area to which the received phase is mapped, from the plurality of signal areas corresponding to the modulation phase number of the modulated signal, on the basis of the inphase signal and the quadrature signal;
- an error selecting means for selecting one from the plurality of phase errors calculated by the error calculating means, in accordance with the signal area discriminated by the area discriminating means; and
- signal synchronizing means for synchronously demodulating the inphase signal and the quadrature signal by feeding back the selected phase error selected by the error selecting means.

In this case, since the phase error of the modulated signal corresponds to the reference phase of the maximum modulation phase number, the phase error is the same even if the modulation phase number of the modulated signal changes. Therefore, even if the modulation phase number of the modulated signal changes in the time division manner, the detection sensitivity of the phase error does not vary. Accordingly, the modulated signal having the changing modulation phase number can be appropriately demodulated. Furthermore, the signal demodulating device can be constituted of a small scale circuit having a simple construction.

The above and other objects, features and advantages of the present invention will be apparent from the following description of preferred embodiments of the invention with reference to the accompanying drawings.

DESCRIPTION OF THE PREFERRED EMBODIMENT

Now, embodiments of the present invention will be described with reference to the accompanying drawings.

Figure 2:
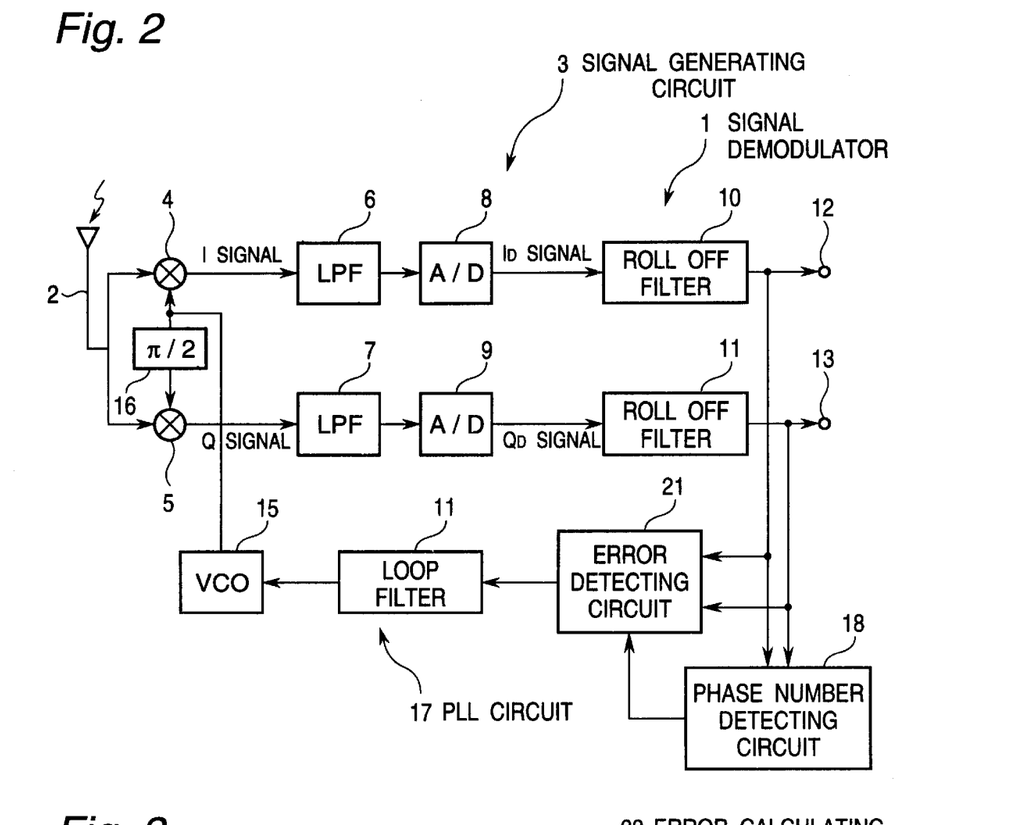
FIG. 2 is a block diagram illustrating an essential part of an embodiment of the signal demodulating device in accordance with the present invention.

Referring to FIG. 2, there is shown a block diagram illustrating an essential part of an embodiment of the signal demodulating device in accordance with the present invention. The shown embodiment of the signal demodulating device in accordance with the present invention includes a radio receiver antenna 2 for receiving a radio signal of the PSK modulated signal. Here, this received radio modulated signal is assumed to be a satellite broadcasting of the ISDB (integrated services digital broadcasting) system. As shown in FIG. 10, the modulation phase number cyclically changes in the order of the binary phase, the quadrature phase and the octal phase.

The antenna 2 is connected to a signal generating circuit 3, which corresponds to a signal generating means, for generating an inphase signal I and a quadrature signal Q from the received modulated signal. In detail, an internal construction of the signal generating circuit 3 is divided into two signal processing systems, one of which includes a multiplier 4, a low pass filter 6, an A/D (analog to digital) converter 8, a roll off filter 10 and a signal output terminal 12 cascade-connected in the named order, and the other of which includes a multiplier 5, a low pass filter 7, an A/D converter 9, a roll off filter 11 and a signal output terminal 13 cascade-connected in the named order, The signal output terminals 12 and 13 are connected to a pair of signal input terminals of an error detecting circuit 21, which is one error detecting means. One signal output terminal of this error detecting circuit 21 is connected through a loop filter 14 to a voltage controlled oscillator (VCO) 15. An output of this voltage controlled oscillator is connected directly to the multiplier 4 for the inphase signal I, and also connected through a π/2 phase shifter 16 to the multiplier 5 for the quadrature signal Q.

The error detecting circuit 21 of this embodiment detects the phase difference of the modulated signal from the inphase signal I and the quadrature signal Q, and the signal output terminals 12 and 13 of the signal generating circuit 3 are fed back to the multipliers 4 and 5. Accordingly, a phase locked loop (PLL) circuit 17 corresponding to a signal synchronizing means, is constructed. This PLL circuit 17 feeds back the phase error detected by the error detecting circuit 21 to the signal generating circuit 3 so as to cause to synchronously demodulate the inphase signal I and the quadrature signal Q.

Furthermore, the signal output terminals 12 and 13 are connected to a phase number detecting circuit 18 which is a phase number detecting means, and an output of the phase number detecting circuit 18 is connected to the error detecting circuit 21. The phase number detecting circuit 18 detects the modulation phase locked to the modulation phase number of the modulated signal received by the radio antenna 2 and changing in order in the time division manner, and notifies the detected modulation phase to the error detecting circuit 21.

Figure 1:
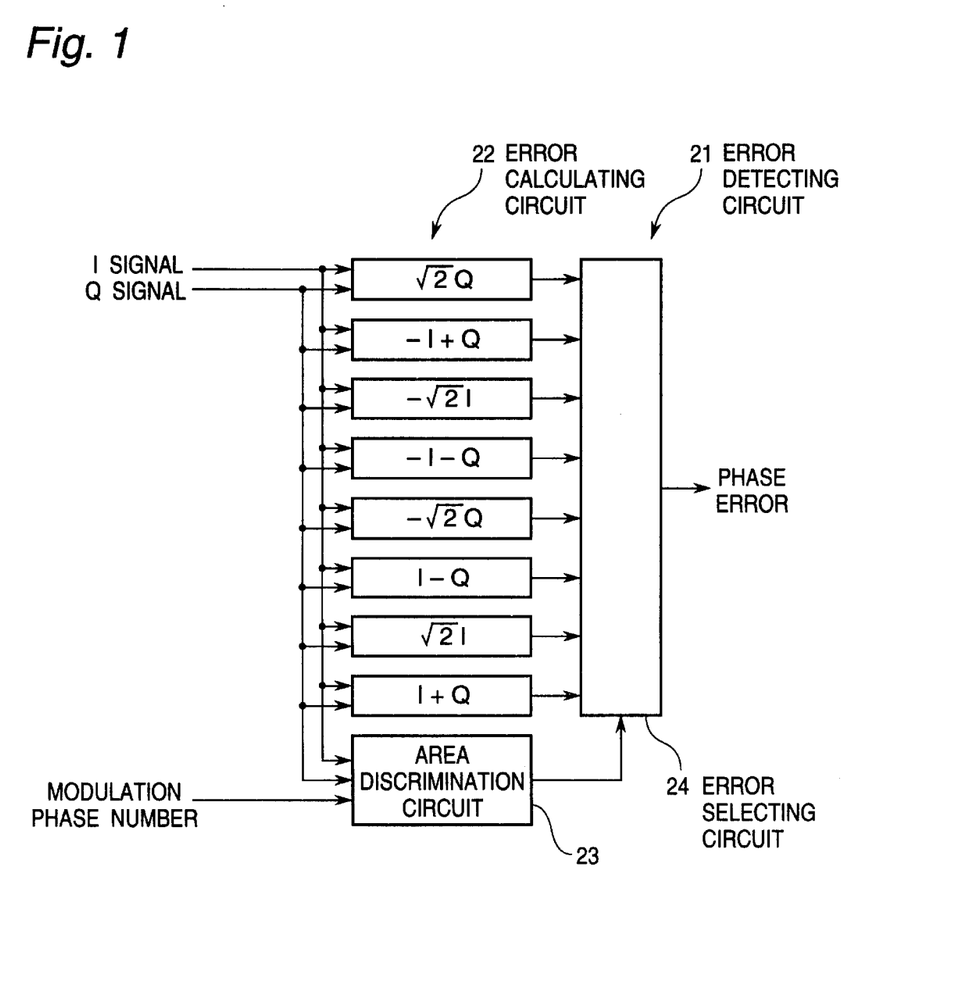
FIG. 1 is a block diagram illustrating a logic structure of an embodiment of the error detecting device in accordance with the present invention.

Referring to FIG. 1, which a block diagram illustrating a logic structure of an embodiment of the error detecting device in accordance with the present invention, the error detecting circuit 21 in this embodiment comprises an error calculating circuit 22 corresponding to an error calculating means, an area discriminating circuit 23 corresponding to an area discriminating means, and an error selecting circuit 24 corresponding to an error selecting means, as essential constituents, for detecting the phase error of the modulated signal from rig the inphase signal I and the quadrature signal Q.

Figure 3:
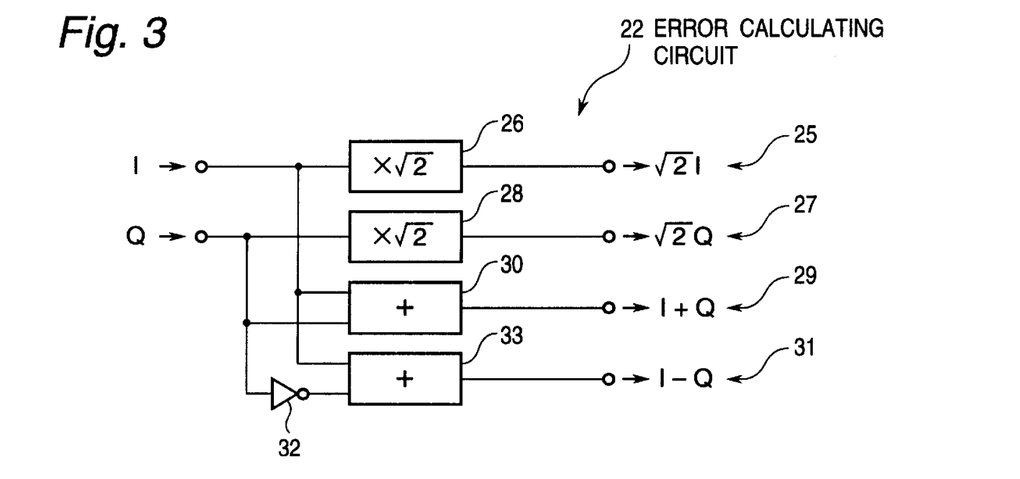
FIG. 3 is a block diagram of an error calculating circuit in the device shown in FIG. 1.

As shown in FIG. 3, which is a block diagram of the error calculating circuit, an internal structure of the error calculating circuit 22 is divided into four systems, for the purpose of calculating four phase of error of "I√2", "Q√2", "I+Q" and "I−Q" from the inphase signal I and the quadrature signal Q. Namely, a first calculating circuit 25 includes a √2 multiplier 26 having an input connected to an input terminal of the inphase signal I. A second calculating circuit 27 also includes a √2 multiplier 28 having an input connected to an input terminal of the quadrature signal Q.

A third calculating circuit 29 includes one adder 30 having a pair of inputs connected to the input terminal of the inphase signal I and the input terminal of the quadrature signal Q, respectively. A fourth calculating circuit 31 includes one adder 33 having one input is connected to the input terminal of the inphase signal I and the other input connected through an inverter 32 to the input terminal of the quadrature signal Q.

The error calculating circuit 22 having the hardware mentioned above, logically has a signal mapping means as a function. This signal mapping means maps the received phase of the modulated signal to the complex plane divided into a plurality of signal areas in accordance with the modulation phase number, while allocating the inphase signal I and the quadrature signal Q as values of the axis of abscissas and the axis of ordinates.

Figure 6A:
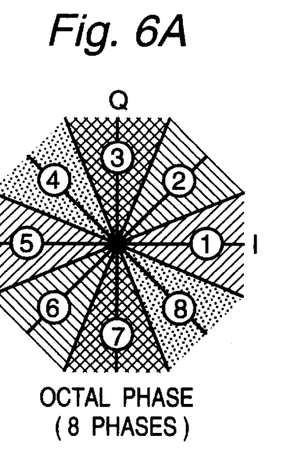
FIGS. 6A, 6B and 6C illustrate signal areas of the octal phase to the binary phase.
Figure 6B:
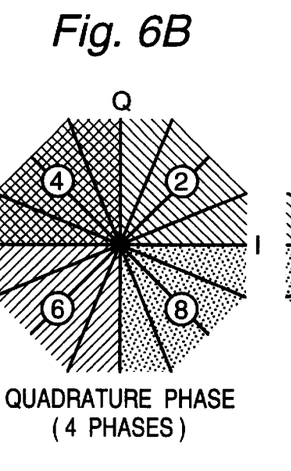
Figure 6C:
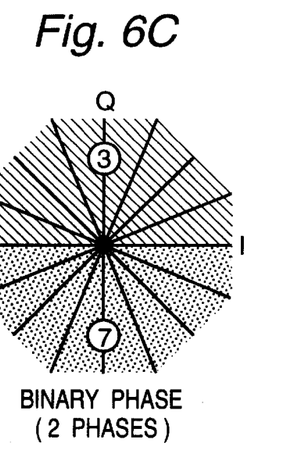
Figure 7:
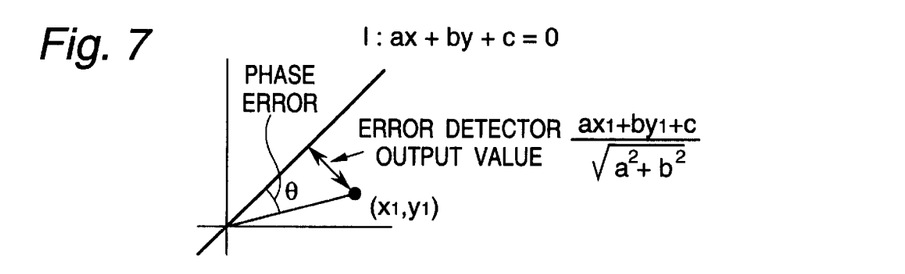
FIG. 7 diagrammatically illustrates the method for calculating the phase error.

In this embodiment, the modulated signal changes between three kinds of the octal phase, the quadrature phase and the binary phase. Therefore, the signal area in the complex plane is divided into eight areas in the case of the octal phase as shown in FIG. 6A, four areas in the case of the quadrature phase as shown in FIG. 6B, and two in the case of the binary phase as shown in FIG. 6B. The received phase of the modulated signal is mapped to the complex plane divided as mentioned above, however, at this time, the error calculating circuit 22 does not recognize the signal area to which the received phase is mapped Therefore, as shown in FIG. 7, the error calculating circuit 22 individually calculates the phase error between the received phase of the modulated signal mapped as mentioned above and the reference phase of a plurality of signal areas corresponding to the maximum modulation phase number, as a distance between the mapped position of the modulated signal and the reference sight line, from at least one of the inphase signal I and the quadrature signal Q.

In this embodiment, since the maximum modulation phase number is eight phases, eight distance between the mapped position of the modulated signal and eight reference straight lines are calculated as "Q√2", "−I+Q", "−I√2", "−I−Q", "−Q√2", "I−Q", "I√2" and "I+Q". However, of the eight phase errors to be calculated, the error calculating circuit 22 calculates only one of each pair of phase errors which has the same value but different only in positive/negative sign. Therefore, the error calculating circuit 22 actually calculates only "I√2", "Q√2", "I+Q" and "I−Q".

Figure 4:
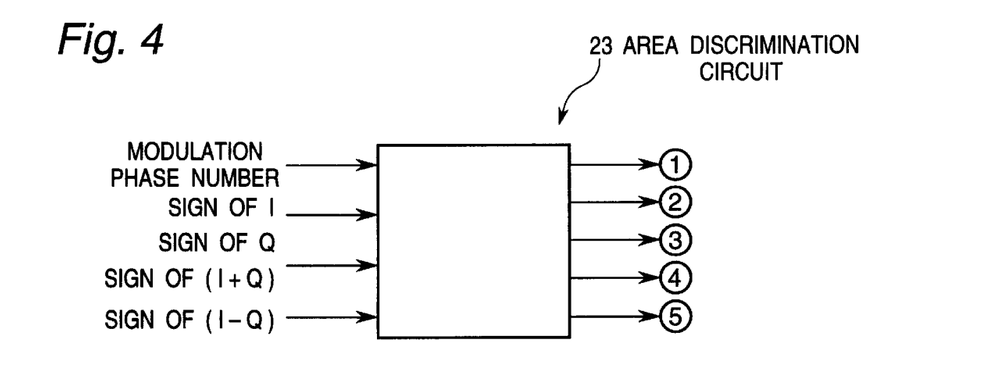
FIG. 4 is a block diagram of an area discriminating circuit in the device shown in FIG. 1.

The area discriminating circuit 23 is constituted of for example a combinational circuit formed of a plurality of logic gates, in order to discriminate and determine, on the basis of the inphase signal I and the quadrature signal Q, one to which the received phase is mapped, from a plurality of signal areas corresponding to the modulation phase number of the modulated signal. Namely, as shown in FIG. 4, the area discriminating circuit 23 receives the signal of the inphase signal I, the sign of the quadrature signal Q, the sign of "I+Q", the sign of "I−Q", and the modulation phase number, and outputs five selection signals to the error selecting circuit 24 as the result of the signal area discrimination.

In this embodiment, since the phase number of the modulated signal changes among the two phases, the four phases and the eight phases, in the case that the phase number of the modulated signal is the two phases, the area discriminating circuit 23 detects one of the "positive/negative sign of the inphase signal I", the "positive/negative sign of the quadrature signal Q", the "positive/negative sign of the sum of the inphase signal I and the quadrature signal Q", and the "positive/negative sign of the result obtained by subtracting one of the inphase signal I and the quadrature signal Q from the other", for the four area patterns, and selects one from the two signal areas.

In addition, in the case that the phase number of the modulated signal is the four phases, the area discriminating circuit 23 detects one of the "positive and negative combination of the inphase signal I and the quadrature signal Q", and the "positive/negative sign of the result obtained by subtracting one of the inphase signal I and the quadrature signal Q from the other", for the two area patterns, and selects one from the four signal areas.

For example, when the modulation phase number changes from the eight phases to the two phases, the area patterns for the two phases become four, as shown in FIGS. 12A, 12B, 12C and 12D. As shown in FIG. 12A, when the reference phase is positioned on the axis of the inphase signal I to become "0" and "180°", the complex plane is divided into signal areas of "90° to 270°" and "270° to 90°". In this area pattern, one signal area can be determined from the two signal areas on the basis of the "positive/negative sign of the inphase signal I".

Figure 12D:
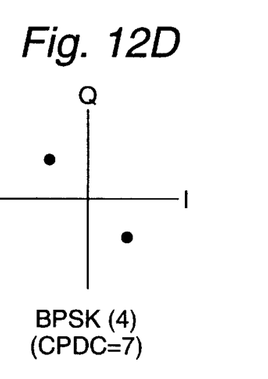

Similarly, as shown in FIG. 12B, when the complex plane is divided into signal areas of "135° to 315°" and "315° to 135°", one signal area can be determined from the two signal areas on the basis of the "positive/negative sign of the sum of the inphase signal I and the quadrature signal Q". As shown in FIG. 12C, when the complex plane is divided into signal areas of "0° to 180°" and "180° to 0°", one signal area can be determined from the two signal areas on the basis of the "positive/negative sign of the quadrature signal Q". As shown in FIG. 12D, when the complex plane is divided into signal areas of "45° to 225°" and "225° to 45°", one signal area can be determined from the two signal areas on the basis of the "positive/negative sign of the result obtained by subtracting one of the inphase signal I and the quadrature signal Q from the other".

Furthermore, when the modulation phase number changes from the eight phases to the two phases, the area patterns for the four phases become two, as shown in FIGS. 11A and 11B. As shown in FIG. 11A, when the complex plane is divided into signal areas of "0° to 90°","90° to 180°", "180° to 270" and "270° to 0°", one signal area can be determined from the four signal areas on the basis of the "positive and negative combination of the inphase signal I and the quadrature signal Q".

Similarly, as shown in FIG. 11B, when the complex plane is divided into signal areas of "45° to 135°", "135° to 225°", "225° to 315°" and "315° to 45°", one signal area can be determined from the four signal areas on the basis of the "positive/negative sign of tie result obtained by subtracting one of the inphase signal I and the quadrature signal Q from the other".

Figure 5:
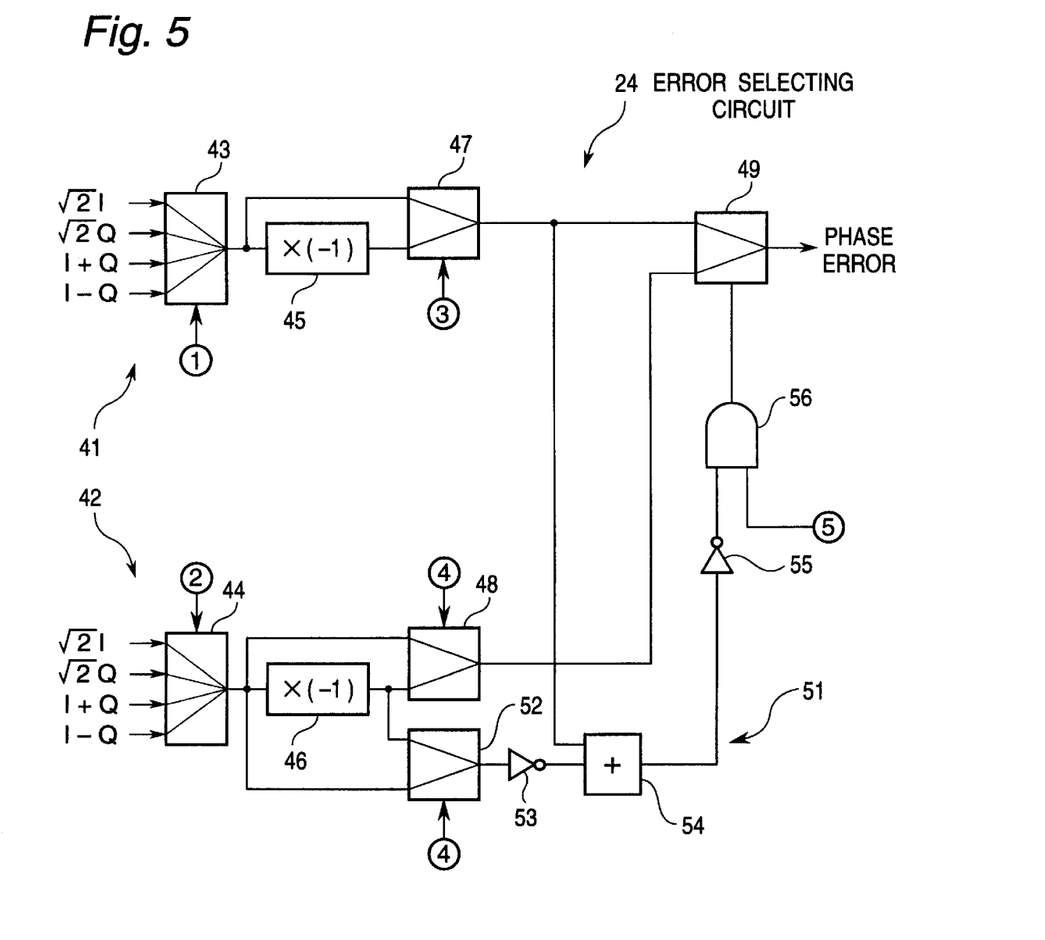
FIG. 5 is a block diagram of an error selecting circuit in the device shown in FIG. 1.

The error selecting circuit 24 receives the eight phase errors calculated by the error calculating circuit 22 as mentioned above, and selects one of the eight phase errors, corresponding to the signal area discriminated and determined by the area discriminating circuit 23 as mentioned above. In detail, since the error calculating circuit 22 actually calculates only four of the eight phase errors as mentioned hereinbefore, as shown in FIG. 5, the four phase errors are supplied to each of two signal processing systems of the error selecting circuit 24.

The error selecting circuit 24 includes a first selecting circuit 41 and a second selecting circuit 42, which include selectors 43 and 44, respectively, for receiving the four phase errors and selecting one of the four phase errors in accordance with the selection signal supplied from the area discriminating circuit 23. An output of the selector 43 is connected directly to one input of a selector 47, and through a sign inverting circuit 45 to the other input of the selector 47. An output of the selector 47 is connected to one input of a selector 49. An output of the selector 44 is connected directly to one input of a selector 48, and through a sign inverting circuit 46 to the other input of the selector 48. An output of the selector 48 is connected to the other input of the selector 49. An output of the selector 49 is connected to an output terminal for the phase error.

The error selecting circuit 24 also includes a selection control circuit 51, which includes a selector 51 having a pair of inputs connected to the input and the output of the sign inverting circuit 46. An output of the selector 51 is connected through an inverter 53 to one input of an adder 54, which has the other input connected the output of the selector 47.

An output of the adder 54 is connected through an inverter 55 to one input of an AND gate 56, which has the other input connected to the selection signal from the area discriminating circuit 23. An output of the AND gate 56 is connected to a selection control input of the selector 49. Thus, the error selecting circuit 24 selects and outputs one of the eight phase errors calculated by the error calculating circuit 22, in accordance with the signal area discriminated and determined by the area discriminating circuit 23.

Incidentally, in the error selecting circuit 24 having the above mentioned structure, the four phase errors are supplied to the two signal processing systems, in which each of the four phase errors is multiplied with "−1" by the sign inverting circuit 45, 46, so that the eight phase errors are generated in total. However, this portion can be considered to be a portion of the error calculating circuit 22.

From the eight phase errors thus generated, only one phase error is selected in accordance with the signal area discriminated and determined by the area discriminating circuit 23. At this time, even if the modulation phase number of the modulated signal is two phases or four phases, since one signal area is designated by the area discriminating circuit 23, one phase error is correspondingly selected from the eight phase error.

However, when the modulation phase number of the modulated signal is eight phases, the two signal processing systems of the error selection circuit 24 select one from the signal areas in the two respective area patterns, so that the two signal areas are selected in total, and then, the phase errors in the two area patterns are compared to each other, so that a smaller one is selected Namely, for one received phase, a minimum phase error is calculated in each of the two area patterns for the four phases, and a smaller one is selected from the two minimum phase errors.

With the above mentioned arrangement, the error detecting circuit 21 in this embodiment can detect the phase error of the PSK modulated signal having the modulation phase number changing in the time division manner, and therefore, the signal demodulating device in this embodiment can demodulate the PSK modulated signal having the modulation phase number changing in the time division manner.

In detail, if the PSK modulated signal having the modulation phase number changing between the two phase, the four phases and the eight phases in the time division manner as shown in FIG. 10, is received by the radio receiver antenna 2 of the signal demodulator of the present invention, the inphase signal I and the quadrature signal Q are generated from the received modulated signal by the signal generating circuit 3, and the modulation phase number of the modulated signal changing in the time division manner is detected by the phase number detecting circuit 18.

On the basis of the modulation phase number thus detected and the inphase signal I and the quadrature signal Q, the error detecting circuit 21 detects the phase error of the modulated signal, so that the PLL circuit 17, which includes the error detecting circuit 21 as a portion, synchronously demodulates the inphase signal I and the quadrature signal Q generated by the signal generating circuit 3

At this time, the error detecting circuit 21 of this embodiment, maps the received phase of the modulated signal to the complex plane divided into a plurality of signal areas in accordance with the modulation phase number of the modulated signal, while allocating the inphase signal I and the quadrature signal Q as values of the as of abscissas and the axis of ordinates.

As shown in FIG. 7, the phase error between the one received phase of the modulated signal mapped as mentioned above and the eight reference phases for the eight phases is calculated as the distance between one mapped position of the modulated signal and the eight reference straight line. Specifically, since the error calculating circuit 22 calculates only one of each pair of phase errors which has the same value but different only in positive/negative sign, the error calculating circuit 22 actually calculates only "I$\sqrt{2}$", "Q$\sqrt{2}$", "I+Q" and I−Q".

The four phase errors thus calculated are divided into the two signal processing systems, and the signal in only one of the two signal processing systems is multiplied with "−1" by the sign inverting circuit 45, 46. Therefore, the eight phase errors of "Q$\sqrt{2}$", "−I+Q", "I$\sqrt{2}$", "−I−Q", "−Q$\sqrt{2}$", "I−Q", "I$\sqrt{2}$" and "I+Q" are calculated by the error calculating circuit 22.

On the other hand, since the modulation phase number, the inphase signal I and the quadrature signal Q are supplied to the area discriminating circuit 23, this area discriminating circuit 23 discriminates and determines one signal area to which the received phase is mapped, from the plurality of signal areas. Specifically, in the case that the phase number of the modulated signal is the two phases, the area discriminating circuit 23 detects one of the "positive/negative sign of the inphase signal I", the "positive/negative sign of the quadrature signal Q", the "positive/negative sign of the sum of the inphase signal I and the quadrature signal Q", and the "positive/negative sign of the result obtained by subtracting one of the inphase signal I and the quadrature signal Q from the other", for the four area patterns, and selects one from the two signal areas.

In addition, in the case that the phase number of the modulated signal is the four phases, the area discriminating circuit 23 detects one of the "positive and negative combination of the inphase signal I and the quadrature signal Q", and the "positive/negative sign of the result obtained by subtracting one of the inphase signal I and the quadrature signal Q from the other", for the two area patterns, and selects one from the four signal areas.

Since the one signal area discriminated and determined by the area discriminating circuit 23 is notified to the error selecting circuit 24, the error selecting circuit 24 selects from the eight phase errors one phase error corresponding to the one signal area notified by the area discriminating circuit 23, so that the phase error of the modulated signal is outputted.

When the modulation phase number is the two phases or the four phases, since the area discriminating circuit 23 selects one signal area as mentioned above, the error selecting circuit 24 selects one phase error. However, when the modulation phase number is the eight phases, the error selecting circuit 24 selects a minimum one of the two phase errors which are respectively calculated in the two area patterns for the four phases.

As mentioned above, since the error detecting circuit in this embodiment can detect the phase error of the modulated signal having the modulation phase number changing in the time division manner. At this time, the eight phase errors are ceaselessly calculated regardless of the modulation phase number of the modulated signal, and one corresponding to the modulation phase number is selected from the eight phase errors.

Figure 8A:
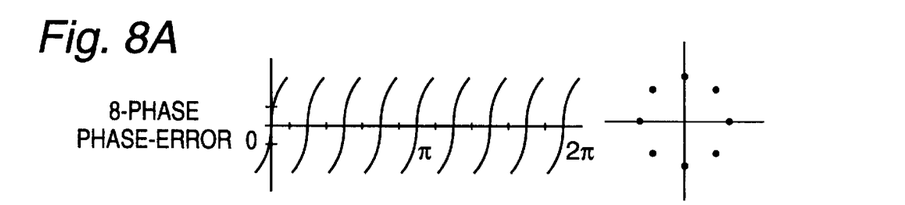
FIGS. 8A, 8B and 8C are characteristic diagrams for illustrating the phase error detecting characteristics in the octal phase to the binary phase.
Figure 8B:
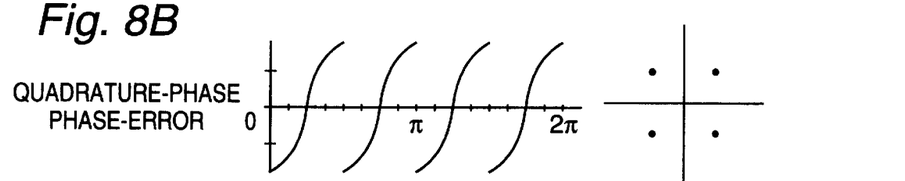
Figure 8C:
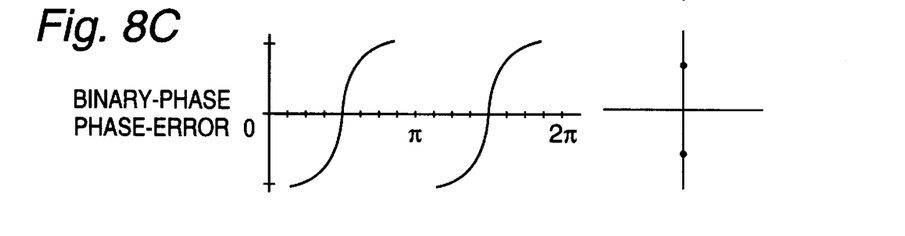

Therefore, even if modulation phase number of the modulated signal changes, the phase error detecting sensitivity of the error detecting circuit 21 in this embodiment does not change as shown in FIGS. 8A, 8B and 8C. Therefore, the signal demodulator I of this embodiment can appropriately demodulate the modulated signal having the modulation phase number changing in the time division manner.

In addition, since the error detecting circuit 21 in this embodiment approximately calculates the phase error of the modulated signal as the distance between the mapped position and the reference straight line, as shown in FIG. 7, the processing for the calculation of the phase error is easy. In particular, since the calculation of the phase error is conducted by the hardware of the error calculating circuit 22, it is possible to speedily calculate a plurality of phase errs.

Further, since the maximum modulation phase number is set to the eight phases, "Q$\sqrt{2}$", "−I+Q", "−I$\sqrt{2}$", "−I−Q", "−Q$\sqrt{2}$", "I−Q", "I$\sqrt{2}$" and "I+Q" can be calculated by a simple calculation from the inphase signal I and the quadrature signal Q. In other words, since the calculation for obtaining the phase errors is simple as mentioned above, this calculation can be realized by the hardware having a simple construction.

Since the error detecting circuit 21 of this embodiment executes the simple calculation for obtaining the eight phase errors, by means of the hardware having a simple construction, a large scale circuit is no longer required to calculate the phase error of the modulated signal having the changing modulation phase number. Namely, a circuit for calculating the phase error of the modulated signal having the changing modulation phase number can be realized with a small scale of circuit.

Moreover, since the eight phase errors are grouped to four groups each having the same value but the different positive/negative signs, only the four phase errors of "I$\sqrt{2}$", "Q$\sqrt{2}$", "I+Q" and "I−Q" are firstly calculated, and then, the positive/negative sign of the four phase errors are inverted, so that the eight phase errors can be generated. Therefore, the hardware is further simplified.

As mentioned above, one phase error corresponding to the signal area is selected from the eight phase errors calculated as mentioned above. But, since the signal area to which the received phase is mapped is discriminated and determined by the area discriminating circuit 23 on the basis of the inphase signal I, the quadrature signal Q and the modulation phase, when the modulation phase number of the modulated signal is the two phase or the four phase, even if the signal area pattern changes, it is possible to select one appropriate phase error from the eight phase errors.

The invention has thus been shown and described with reference to the specific embodiment. However, it should be noted that the present invention is in no way limited to the details of the illustrated structures but changes and modifications may be made within the spirit of the invention.

For example, the various means in the error detecting circuit 21 in the above mentioned embodiment are constituted of respective dedicated hardware. However, various means included in the signal demodulator I can be realized by a computer operating with an appropriate software, or alternatively, it is possible that a portion of the various means included in the signal demodulator 1 is realized by software and the other is realized by hardware.

In the case that the various means in the error detecting circuit 21 are realized by software, it is sufficient if the information storing medium such as a RAM or a ROM of a computer is programmed as a program to be executed by the CPU of the computer, to the effect that (1) the received phase of the modulated signal is mapped to the complex plane divided into a plurality of signal areas corresponding to the modulation phase number by allocating the inphase signal and the quadrature signal as values of the axis of abscissas and the axis of ordinates in a complex plane, (2) the phase error between the received phase of the modulated signal thus mapped and the reference phase of each of a plurality of signal areas corresponding to the maximum modulation phase number is individually calculated as the distance between the mapped position of the modulated signal and the reference straight line, from one of the inphase signal and the quadrature signal, (3) one signal area to which the received phase is mapped is discriminated and selected from the plurality of signal areas corresponding to the modulation phase number of the modulated signal, on the basis of the inphase signal and the quadrature signal, and (4) one phase error corresponding to the selected signal area is selected from the plurality of phase errors.

What is claimed is:

1. An error detecting method for calculating a phase error in a PSK modulated signal having a predetermined modulation phase number, wherein a received phase of the modulated signal is mapped as a point on a complex plane by allocating an inphase signal and a quadrature signal generated from the modulated signal as corresponding to values of the axis of abscissas and the axis of ordinates, and wherein said complex plane is considered divided into a plurality of signal areas based on said predetermined modulation phase number, the method comprising:

calculating for each of a received phase of the modulated signal, as mapped to be a point on said complex plane, a plurality of phase errors, each said phase error calculated as being the perpendicular distance of said point from one of a plurality of reference straight lines, wherein said plurality of reference straight lines is derived as a predefined function of said inphase signal and said quadrature signal;

discriminating one signal area of said plurality of signal areas to which the received phase is mapped on the basis of the inphase signal and the quadrature signal; and selecting one from the plurality of phase errors calculated above, in accordance with the discriminated signal area.

2. An error detecting method for calculating a phase error in a PSK modulated signal having a modulation phase number changing in a time division manner wherein a received phase of the modulated signal is mapped as a point on a complex plane by allocating an inphase signal and a quadrature signal generated from the modulated signal as corresponding to values of the axis of abscissas and the axis of ordinates, and wherein said complex plane is considered divided into a plurality of signal areas based on said a predetermined maximum modulation phase number, the method comprising:

calculating a phase error between the received phase of the modulated signal mapped on the complex plane and a reference phase in each of said plurality of signal areas;

discriminating one signal area of said plurality of signal areas to which the received phase is mapped on the basis of the inphase signal and the quadrature signal; and selecting one from the plurality of phase errors calculated above, in accordance with the discriminated signal area.

3. An error detecting device for calculating a phase error in a PSK modulated signal having a predetermined modulation phase number, wherein a received phase of the modulated signal is mapped on a complex plane by allocating an inphase signal and a quadrature signal generated from the modulated signal as values of the axis of abscissas and the axis of ordinates, wherein said complex plane is considered divided into a plurality of signal areas based on said predetermined modulation phase number, and wherein said phase error is calculated between the received phase of the modulated signal thus mapped and a reference phase in each of said plurality of signal areas, the device comprising:

signal converter for mapping the received phase of the modulated signal onto the complex plane by allocating the inphase signal and the quadrature signal as the values of the axis of abscissas and the axis of ordinates, respectively;

calculator for calculating the phase error between the received phase of the modulated signal mapped by said signal converter and a reference phase in each of the plurality of signal areas, said phase error calculated as a perpendicular distance between the mapped position of the modulated signal and a reference straight line;

calculator for discriminating which one signal area of said plurality of signal areas the received phase is mapped, based on the in-phase signal and the quadrature signal; and selector for selecting one from said plurality of calculated phase errors, based on said discriminated area.

4. An error detecting device claimed in claim 3, wherein said PSK modulated signal has a modulation phase number changing in a time division manner, and wherein said calculator individually calculates the phase error between the received phase of the modulated signal mapped on the complex plane and a reference phase in each of the plurality of signal areas corresponding to a maximum modulation phase number so as to obtain a plurality of phase errors, and said one signal area to which the received phase is mapped corresponds to the currently received modulation phase number of the modulated signal.

5. An error detecting device claimed in claim 4, wherein said calculator calculates the phase error between the received phase of the modulated signal as mapped and a reference phase in each of said plurality of signal areas corresponding to said maximum modulation phase number, as a distance between the mapped position of the modulated signal and a reference straight line, so as to obtain a plurality of phase errors.

6. An error detecting device claimed in claim 5, wherein the modulation phase number of said modulated signal changing in the time division manner comprises two phases, four phases, and eight phases, and wherein said calculator calculates the phase error between said modulated signal and the following eight reference phases: "Q$\sqrt{2}$", "–I+Q", "–I$\sqrt{2}$", "–I–Q", "–Q$\sqrt{2}$", "I–Q", "I$\sqrt{2}$" and "I+Q".

7. An error detecting device claimed in claim 6, wherein said calculator calculates only one of a pair of phase errors having the same value and different positive/negative signs, and then, sign-inverts the calculated phase error.

8. An error detecting device claimed in claim 7, wherein said calculator comprises four error calculating circuits, each calculating only one of a pair of phase errors having the same value and different positive/negative signs, and a positive/negative signs inverting circuit receiving the output of each of said four error calculating circuits for outputting a sign-inverted phase error.

9. An error detecting device claimed in claim 3, wherein the modulation phase number of said modulated signal comprises eight phases, and said calculator calculates the phase error between said modulated signal as mapped onto said complex plane and the following eight reference phases: "Q√2", "−I+Q", "−I√2", "−I−Q", "Q√2", "−I−Q", "I√2" and "I+Q".

10. An error detecting device claimed in claim 9, wherein said calculator calculates only one of a pair of said phase errors having the same value and different positive/negative signs, and then, sign-inverts the calculated phase error.

11. An error detecting device claimed in claim 10, wherein said error calculating computer includes four circuits, each calculating only one of a pair of said phase errors having the same value and different positive/negative signs, and a positive/negative signs inverting circuit receiving the output of each of said four circuits for outputting a sign-inverted phase error.

12. An error detecting device claimed in claim 4, wherein when the modulation phase number of said modulated signal is two phases, said calculator for discriminating area uses the four following signals to define four area patterns and to select one of the possible two signal areas: the "positive/negative sign of the inphase signal I", the "positive/negative sign of the quadrature signal Q", the "positive/negative sign of the sum of the inphase signal I and the quadrature signal Q", and the "positive/negative sign of the result obtained by subtracting one of the inphase signal I and the quadrature signal Q from the other".

13. An error detecting device claimed in claim 4, wherein when the modulation phase number of said modulated signal is four phases, said calculation for discriminating area uses the following to define four possible signal areas and to select one of said possible four areas: the "positive and negative combination of the inphase signal I and the quadrature signal Q", and the "positive/negative sign of the result obtained by subtracting one of the inphase signal I and the quadrature signal Q from the other".

14. An error detecting device claimed in claim 4, wherein the modulation phase number of said modulated signal changing in time division manner comprises two phases, four phases, and eight phases, and wherein when the modulation phase number of said modulated signal is the two phases, said area discriminating calculation uses the following to define areas and to select one of the two possible signal areas: the "positive/negative sign of the inphase signal I", the "positive/negative sign of the quadrature signal Q" the "positive/negative sign of the sum of the inphase signal I and the quadrature signal Q", and the "positive/negative sign of the result obtained by subtracting one of the inphase signal I and the quadrature signal Q from the other", when the modulation phase number of said modulated signal is the four phases, said area discriminating calculation uses the following to define two area patterns and to select one of the four possible signal areas: the "positive and negative combination of the inphase signal I and the quadrature signal Q", and the "positive/negative sign of the result obtained by subtracting one of the inphase signal I and the quadrature signal Q from the other", and when the modulation phase number of said modulated signal is the eight phases, said area discriminating calculation further selects one signal area from each two area patterns for the four phases, further calculates the phase error in each of the two area patterns, and selects a smaller one from the two calculated phase errors.

15. A signal demodulating method comprising:

receiving a PSK modulated signal having a predetermined modulation phase number;

generating an inphase signal and a quadrature signal from the modulated signal;

mapping a received phase of the modulated signal as a point on a complex plane divided into a plurality of signal areas corresponding to said modulation phase numbers, by allocating said inphase signal and said quadrature signal as values of the axis of abscissas and the axis of ordinates;

calculating a plurality of phase errors for each received phase corresponding to a plurality of signal areas determined on said predetermined modulation phase number, each said phase error being a distance between the received phase of the modulated signal mapped as a point on the complex plane and a reference phase in each of said plurality of signal areas;

discriminating one signal area to which the received phase is mapped, from the plurality of signal areas, on the basis of the inphase signal and the quadrature signal;

selecting one from the plurality of phase errors calculated above, in accordance with the discriminating signal area; and synchronously demodulating said inphase signal and said quadrature signal by feeding back the selected phase error.

16. A signal demodulating method comprising:

receiving a PSK modulated signal having different modulation phase numbers sequentially transmitted in a time division manner;

generating an inphase signal and a quadrature signal from the modulated signal and detecting the modulation phase numbers sequentially changing in the time division manner;

mapping a received phase of the modulated signal on a complex plane divided into a plurality of signal areas corresponding to said modulation phase number, by allocating said inphase signal and said quadrature signal as values of the axis of abscissas and the axis of ordinates;

calculating a phase error between the received phase of the modulated signal mapped on the complex plane and a reference phase in each of a plurality of signal areas corresponding to a maximum modulation phase number, so as to obtain a plurality of phase errors;

discriminating one signal area to which the received phase is mapped, from the plurality of signal areas corresponding to the modulation phase number, on the basis of the inphase signal and the quadrature signal;

selecting one from the plurality of phase errors calculated above, in accordance with the discriminated signal area; and synchronously demodulating said inphase signal and said quadrature signal by feeding back the selected phase error.

17. A signal demodulating device comprising:

a data receiving means for receiving a PSK modulated signal having a predetermined modulation phase number;

a signal generating means for generating an inphase signal and a quadrature signal from the modulated signal received by said data receiving means;

a signal mapping means for mapping a received phase on the modulated signal on a complex plane divided into a plurality of signal areas corresponding to said modulation phase number, by allocating said inphase signal and said quadrature signal as values of the axis of abscissas and the axis of ordinates;

an error calculating means for calculating the phase error between the received phase of the modulated signal mapped by said signal mapping means and a reference phase in each of the plurality of signal areas, as a distance between the mapped position of the modulated signal and a reference straight line corresponding to each of said plurality of signal areas, so as to obtain a plurality of phase errors;

an area discriminating means for discriminating one signal area to which the received phase is mapped, from the plurality of signal areas, on the basis of the inphase and the quadrature signal;

an error selecting means for selecting one from the plurality of phase errors calculated by said error calculating means, in accordance with the signal area discriminated by said area discriminating means; and signal synchronizing means for synchronously demodulating said inphase signal and said quadrature signal by feeding back the selected phase error selected by said error selecting means.

18. A signal demodulating device claimed in claim 17, wherein said receiving means receives a PSK modulated signal having different modulation phase numbers sequentially transmitted in a time division manner, further comprising:

a phase number detecting means for detecting the modulation phase numbers sequentially changing in the time division manner, of the modulated signal received by said data receiving means, wherein said error calculating means calculates the phase error between the received phase of the modulated signal mapped on the complex plane and a reference phase in each of the plurality of signal areas corresponding to a maximum modulation phase number from at least one of said inphase signal and said quadrature signal, so as to obtain a plurality of phase errors; and wherein said area discriminating means discriminates said one signal area to which the received phase is mapped, from the plurality of signal areas corresponding to the modulation phase number, on the basis of the inphase signal and the quadrature signal.

19. A signal demodulating device comprising:

a data receiver receiving a PSK modulated signal having different modulation phase numbers sequentially transmitted in a time division manner;

a signal generator for generating an inphase signal and a quadrature signal from the modulated signal received by said data receiver;

a phase number detector for detecting the modulation phase numbers sequentially changing in the time division manner, of the modulated signal received by said data receiver;

a signal transformer for mapping a received phase of the modulated signal as a point on a complex plane divided into a plurality of signal areas corresponding to said modulation phase number, by allocating said inphase signal and said quadrature signal as values of the axis of abscissas and the axis of ordinates;

an error calculator for calculating the phase error between the received phase of the modulated signal as mapped to be a point and a reference phase in each of a plurality of signal areas corresponding to a maximum modulation phase number, so as to obtain a plurality of phase errors;

an area discriminator discriminating one signal area to which the received phase is mapped, from the plurality of signal areas corresponding to the modulation phase number of the modulated signal, on the basis of the inphase signal and the quadrature signal;

an error selector selecting one from the plurality of phase errors calculated by said error calculator, in accordance with the discriminated signal area; and signal demodulator synchronously demodulating said inphase signal and said quadrature signal, based on feeding back the selected phase error.

* * * * *